United States Patent [19]
Sun et al.

[11] Patent Number: 5,741,179
[45] Date of Patent: Apr. 21, 1998

[54] MODULAR AIR OUTLET ASSEMBLY AND METHOD OF MAKING SAME

[75] Inventors: Andy Kwan-Leung Sun, North York, Canada; Michael Stephen Mikowski, Lake Leelanau, Mich.

[73] Assignee: Manchester Plastics, Inc., Troy, Mich.

[21] Appl. No.: 649,089

[22] Filed: May 17, 1996

[51] Int. Cl.⁶ ................................................. B60H 1/34
[52] U.S. Cl. .......................... 454/155; 454/315; 454/316
[58] Field of Search ................................ 454/155, 313, 454/315, 316

[56] References Cited

U.S. PATENT DOCUMENTS

| | | |
|---|---|---|
| D. 245,099 | 7/1977 | Wilson . |
| 3,512,470 | 5/1970 | Warren . |
| 3,877,356 | 4/1975 | Bruns . |
| 3,905,284 | 9/1975 | Busse et al. . |
| 3,937,133 | 2/1976 | Bertin et al. . |
| 4,140,105 | 2/1979 | Duvlis . |
| 4,345,510 | 8/1982 | Sterett . |
| 5,001,967 | 3/1991 | Hungerford . |
| 5,014,610 | 5/1991 | Twito . |
| 5,046,406 | 9/1991 | Harris et al. ............................ 98/40.24 |
| 5,188,561 | 2/1993 | Nissimoff et al. . |
| 5,322,470 | 6/1994 | Vartiainen et al. . |
| 5,335,144 | 8/1994 | Maroushek . |
| 5,397,267 | 3/1995 | Vecellio et al. . |

*Primary Examiner*—Harold Joyce
*Assistant Examiner*—Derek S. Boles
*Attorney, Agent, or Firm*—Bliss McGlynn, P.C.

[57] ABSTRACT

An outlet assembly (10) is assembled from different shaped end modules (14,16,18) and any number of standard intermediate modules (20). Depending on the desired shape and length of the assembly (10), two of the end modules (14, 16,18) are selected with any number of the intermediate modules (20) assembled therewith forming a housing (22). The housing (22) may form the barrel housing pivotable within a support (68). Louvers (76) and vanes may be connected therewith.

27 Claims, 4 Drawing Sheets

MODULAR AIR OUTLET ASSEMBLY AND METHOD OF MAKING SAME

BACKGROUND OF THE INVENTION

1. Field of the Invention

The present invention relates generally to air ventilating outlets which are comprised of various modules to alter the geometries and dimensions of the outlet depending on the selected combination of components, and more particularly toward air ventilating outlets used in vehicles.

2. Description of the Related Art

Air ventilating outlets are commonly used for heating and cooling in vehicles. Such designs are typically molded designs of singular shape and dimension which are inserted into a predefined housing of a vehicle. Due to manufacturing costs, it is desirable to mold such outlets in an easy to assemble and manufacture manner with a wide variety of uses.

U.S. Pat. No. 3,877,356 issued Apr. 15, 1975 in the name of Bruns discloses an air outlet grille for walls or ceilings which incorporates a plurality of air projecting modules to direct air in different directions which are interchangeable in a particular grille to provide combined air outlet patterns as desired. Each module is its own housing, i.e. each module is separate. The outlet modules aid in altering air flow direction only. Once the modules are selected and the outlet assembled, the air flow pattern is fixed. There are no removable or adjustable members in the assembled unit.

U.S. Pat. No. 5,188,561 issued Feb. 23, 1993 in the name of Nissimoff et al. discloses a modular grille unit which may be arranged to a desired configuration. Standard end pieces or center sections are utilized with wall portions therebetween and vanes, wherein any number may be assembled along a length as required. The patent discloses a single, standardized outlet module wherein multiple such units can be interconnected together.

U.S. Pat. No. 3,905,284 issued Sep. 16, 1975 in the name of Busse et al. discloses a grille which includes unassembled parts or segments and a frame which are easily combined. However, the final assembled grille is fixed and offers no air directability.

U.S. Pat. No. 5,014,610 issued May 14, 1991 in the name of Twito discloses a modular outlet end unit and louver units for air ducts. The louver unit includes a plurality of sections which allow construction in various dimensions. The louvers are slideably engageable with one another and include center pieces and end pieces. Each outlet module is a stand alone and the front vane set of each interconnected modules operates independently.

The prior art fails to teach the use of a small number of modules to construct a large number of unique outlets to provide styling variations at a reduced cost. Each outlet may provide a different shape and contour. However, the function of each outlet combination remains the same.

SUMMARY OF THE INVENTION

The invention includes a method of forming an outlet assembly and includes the steps of providing a first end module having arms extending therefrom establishing a first open side with the arms including first interconnecting members. Also included is providing a second end module having arms extending therefrom establishing a second open side with the arms including second interconnecting members. Also included is providing a third end module having arms extending therefrom establishing a third open side with the arms including third interconnecting members, the third end module having a shape different from the second end module. The method also includes selectively assembling the first member to the second member to provide a first outlet assembly of a first perimeter shape and assembling the first member to the third member to provide a second outlet assembly of a second perimeter shape different from the first perimeter shape.

Also included is a modular outlet assembly having sides extending between first and second ends. The assembly includes the first end module, the second end module, the first and second interconnecting members, and the third end module of a contour different from the second end module, the third end module selectively replaceable with the second module forming an outlet assembly of different shape from the first outlet assembly.

Also included is at least one intermediate module having arms extending from two open ends thereof forming a portion of the sides. The intermediate module is connected by intermediate interconnecting members between each of the first and the second end modules to form an extended outlet assembly.

BRIEF DESCRIPTION OF THE DRAWINGS

Advantages of the subject invention will be readily appreciated as the same becomes better understood by reference to the following detailed description when considered with the accompanying drawings wherein.

DESCRIPTION OF THE PREFERRED EMBODIMENT(S)

Figure 1:
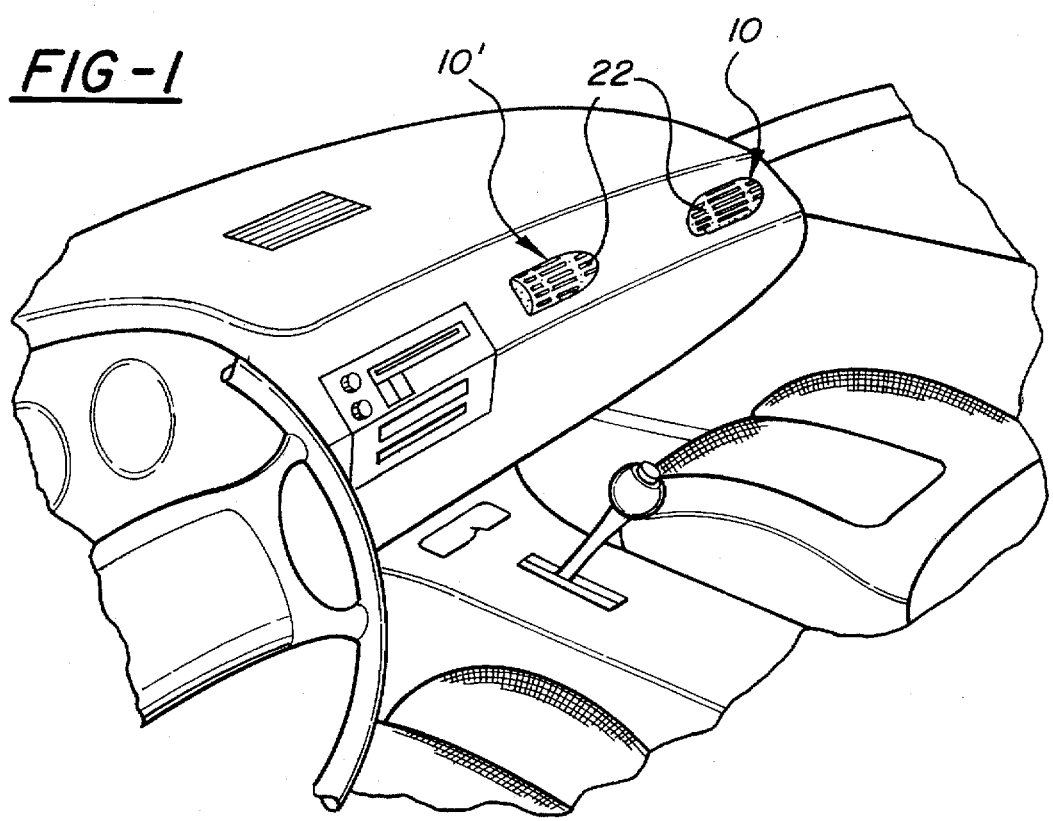
FIG. 1 is perspective view of different outlet assemblies as used in a vehicle.
Figure 4:
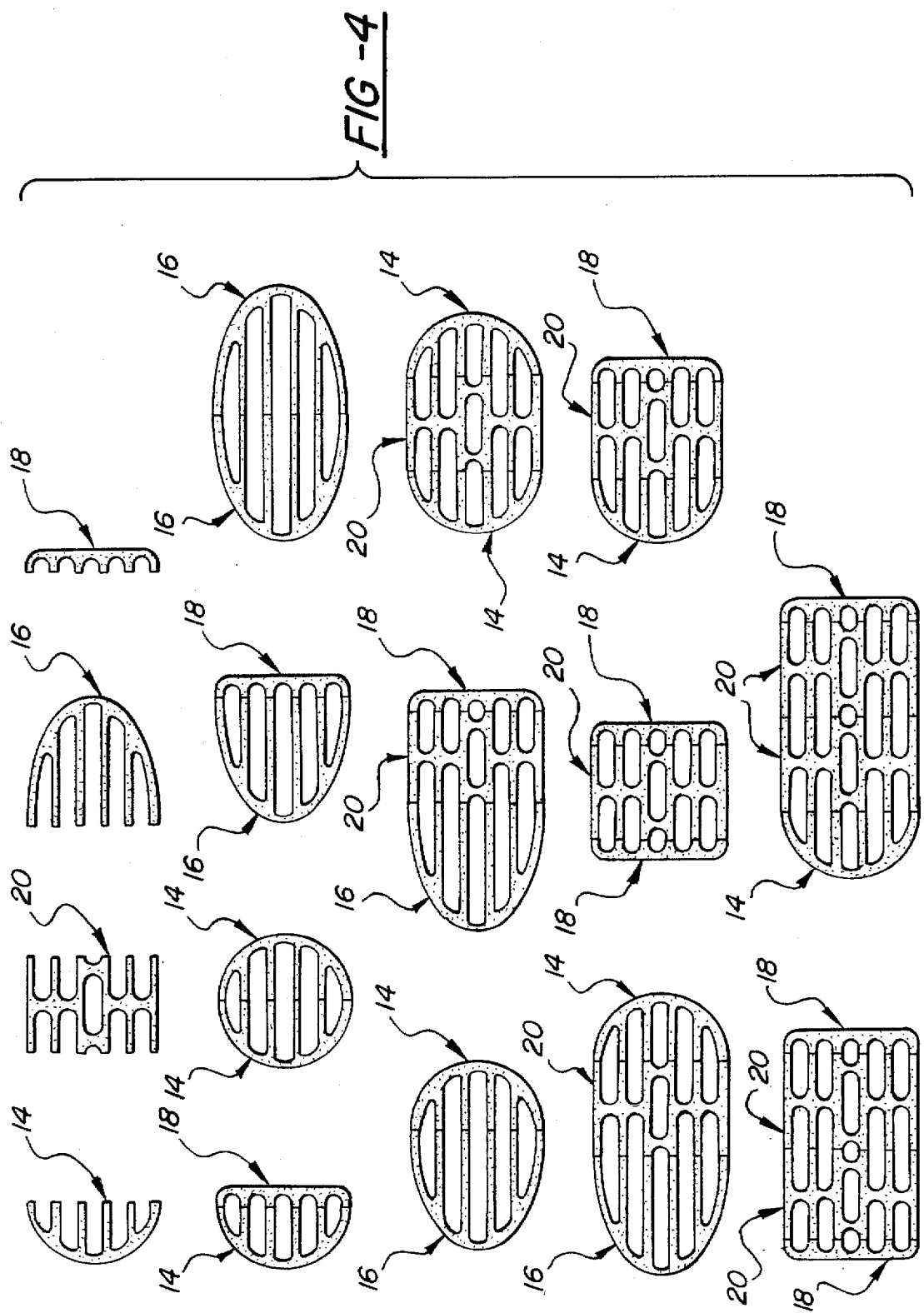
FIG. 4 is a plan view of the modules in different combinations.

Two outlet assemblies 10, 10' are generally illustrated in FIG. 1 as used in a vehicle 12. The outlet assemblies 10, 10' are formed of modular components and therefore allow different contoured components to be assembled to form different geometry outlet assemblies as illustrated in FIG. 4. Each outlet assembly 10 is made up of various modules which may be connected together to form various perimeter shapes or contours as required in the application of the assembly 10 as part of the ventilating system. Such modular system allows a few modules to be formed and molded which can create a multitude of final assembly designs by different combinations thereof. Though specific design are illustrated herein, it is to be understood that other shapes and sized may be utilized based on the teachings of this invention.

In the preferred embodiment, a single outlet assembly 10 will be described with the understanding that various assemblies are formed by the combination of the different components described herein. The outlet assembly 10 is formed from any combination of a first end module 14, second end module 16, third end module 18, and any number of standard intermediate modules 20. To form the outlet assembly 10, any combination of two of the first 14, second 16, and third 18 end modules may be selected and formed together to form the outlet assembly 10, and may include any number of intermediate modules 20 connected therebetween to extend in length the assembly 10 as desired. As can be appreciated, more or less modules may be used to obtain any desired geometry, and the geometries shown are merely representative. The end modules 14, 16, 18 are interchangeable and the terminology "first", "second" and "third" will be merely for reference in distinguishing end modules of different geometries. However, the terminology is not limited to the geometries illustrated.

Figure 3:
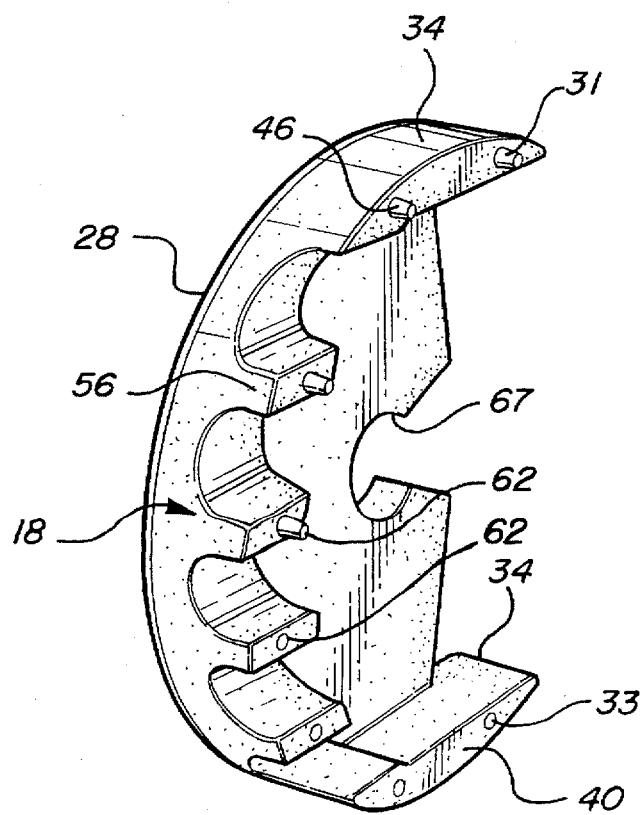
FIG. 3 is a perspective view of a third end module.
Figure 2:
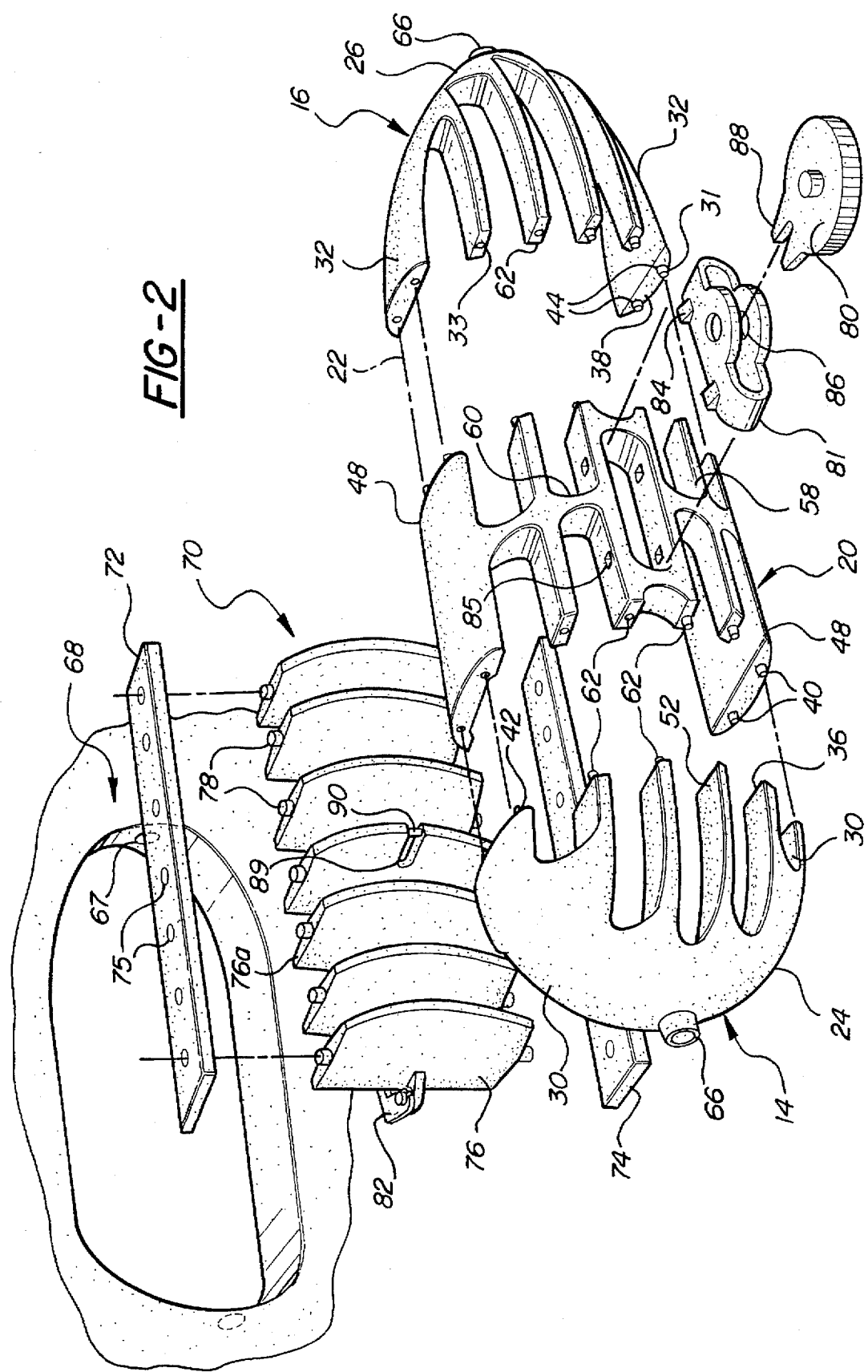
FIG. 2 is an exploded perspective view of an outlet assembly using the first end, intermediate module and second end module.

The combination of the end modules 14,16,18 and any intermediate modules 20 form a barrel 22 of the outlet assembly 10. In the first embodiment as best illustrated in FIGS. 2–3, each of the end modules 14,16,18 include a perimeter wall 24,26,28, respectively, which include pairs of arms 30,32,34 extending therefrom to form a part of the perimeter and extending to form first, second and third open sides, 36,38,40, respectively. When the end modules 14,16, 18 are assembled to form the outlet assembly 10, the perimeter walls 24,26,28 are enclosed against one another forming a continuous perimeter wall about the barrel 22. In the preferred embodiment, the arms 30,32,34 extend parallel with one another.

The end modules 14, 16, 18 also include first, second, and third interconnecting members 42,44,46, respectfully, extending outwardly from the arms 30,32,34, respectively, to allow engagement of any combination of the end modules 14,16,18 with one another or with duplicates of itself. The interconnecting members 42,44,46 are typically pins 31 extending from one arm and receptacles 33 extending within the other opposing arm 30,32,34 on its respective module 14,16,18. In this manner, all left side ends (i.e., relative to FIG. 3) will include the pins 31 on the top arm and the receptacles 33 on the bottom arm. When flipped, the pins 31 and receptacles 33 are reversed so that all end modules 14,16,18 can be interconnected.

Also included is the intermediate module 20 which includes a pair of arms 48 extending outwardly and opposing one another on each side thereof. Each of the arms 48 also includes intermediate interconnecting members 40 extending there from to engage within the interconnecting members of similar intermediate modules 48 or any of the end modules 14,16,18. The intermediate interconnecting members 40 likewise include similar pins 31 and receptacles 33.

Each of the end modules 14,16,18 and the intermediate module 20 include at least one vane 52,54, 56,58, respectively, extending generally parallel to and between the pairs of arms 30,32,34,48 which provides additional air directability. In the preferred embodiments a plurality of the vanes 52–58 are utilized between each pair of arms 30,32, 34,48. The vanes 52-58 are connected to the perimeter wall 24–28 in the case of the end modules 16,18,20, and are connected by interconnecting webs 60 in the case of the intermediate module 20. The vanes 52–58 also include interconnecting members 62 as in the arms 30,32,34,48. In the preferred embodiment, the vanes 52,54,56,58 are connected to form a radiused or curved barrel 22.

Each of the arms 30–34, 48 and vanes 52–58 are comprised of generally flat planks or sheets having a planar width parallel to the air flow for re-directing air.

It can be appreciated that with the designs of the end modules 14–18 and intermediate module 20, that any combination of the end modules 14–18 may be used and combined with any number of the intermediate modules 20 These combinations form the barrel 22 for a commonly known barrel-type outlet assembly 10. Depending upon the contour and perimeter length of the outlet assembly 10, the user may selectively replace and assemble the end modules 14–18 optionally with the intermediate module 20.

As illustrated in FIG. 4, a variety of different geometry outlet assemblies 10 may be formed based on the modules 14–20 (not all combinations are shown). As illustrated, the first end module 14 is semi-circular in perimeter shape. The second end module 16 is semi-oval in perimeter shape. The third end module 18 is rectangular in perimeter shape. The intermediate module 20 is also rectangular in shape, i.e. the arms 48 and vanes 58 are parallel and effectively extend the same length. Each of the modules 14–20 are of the same height and the arms 30–40, 48 and vanes 52–58 of the same spacing to line up appropriately during assembly of the barrel 22 to form an enclosed perimeter, and so that air may flow freely between end modules 14–18.

The barrel 22 formed by the modules 14–20 may be then secured within a vehicle 12 in any commonly known manner. The barrel 22 rotates about pivot pins 66 formed in the end modules 16–20 which extend into apertures 67 formed in a support housing 68 to pivot about a horizontal axis. The barrel 22 allows the user to direct air upward and downward. The barrel 22 is received within a support housing 68 which is in turn mounted in a vehicle 12 or other structure.

Furthermore, the outlet assembly 10 may include a louver assembly 70 connected within the barrel 22 to allow the user to adjust air flow from side to side. Such function of directing air flow is commonly known in the art and may be implemented in the plurality of ways. The louver assembly 70 may also be comprised of interconnectable modules which allow the vertical louvers to pivot side to side in unison.

As shown in the preferred embodiment, the louver assembly 70 includes and upper and lower pivot plates 72, 74 which is mounted in and secured along the arms 30–34, 48 of the barrel 22. Thereafter, a plurality of louvers 76 having pins 78 extending from the upper and lower ends thereof are secured between and within the upper and lower pivot plate 72,74 at apertures 75. A pivot control plate 82 is connected at the back side of the louvers 76 to interconnect same and allow same to pivot together, in a known manner. This allows the louvers 76 to pivot from side to side. The louvers 76 adjacent the end modules 14–18 are shortened in height particularly when using the first and second end modules 14, 16 to fit within the tapered ends of the barrel 22.

A control knob 80 is connected to a center control louver 76a to allow a user to pivot the louvers 76 from side to side as desired. The knob 80 includes a knob retainer 81 which may be snap fit between any selective vanes 52, 54, 56, 58. The knob retainer 81 includes flanges 84 extending therefrom to engage notches 85 formed in the vanes 52–58. The knob retainer 81 includes two opposing openings 86 to allow the knob 80 Co pivot along the plane of the vanes 52–58. The knob 80 includes a fork control 88 extending through the retainer 81 to engage the control louver 76a. The control louver 76a includes a cut out 89 with a stem 90 extending therethrough to receive the fork control 88 allowing pivoting engagement therebetween.

In operation, a user selects any combination of two of the first, second, and third end modules 14,16,18 (can be different shaped end modules or duplicate end modules for symmetry). Once the end shapes are established by selection of the end modules 14,16,18, any number of the intermediate modules 20 may be inserted between the two selected end modules 14,16,18 to obtain the desired length of the barrel 22. All the modules 14,16,18,20 selected are assembled together to form the barrel 22. Thereafter, the pivot plates 72,74 may be cut or otherwise formed to the appropriate length and mounted to the arms 30,32,34,48 by adhesive or other suitable fasteners. In a similar manner, the control plate 82 is also sized and the appropriate number of louvers 76 connected thereto. The louvers 76 are then snapped into the pivot plates 72,74. The knob 80 is assembled and appropriately placed in the barrel 22. The barrel 22 may then be snapped onto the pins 66 of the housing support 68.

Figure 5:
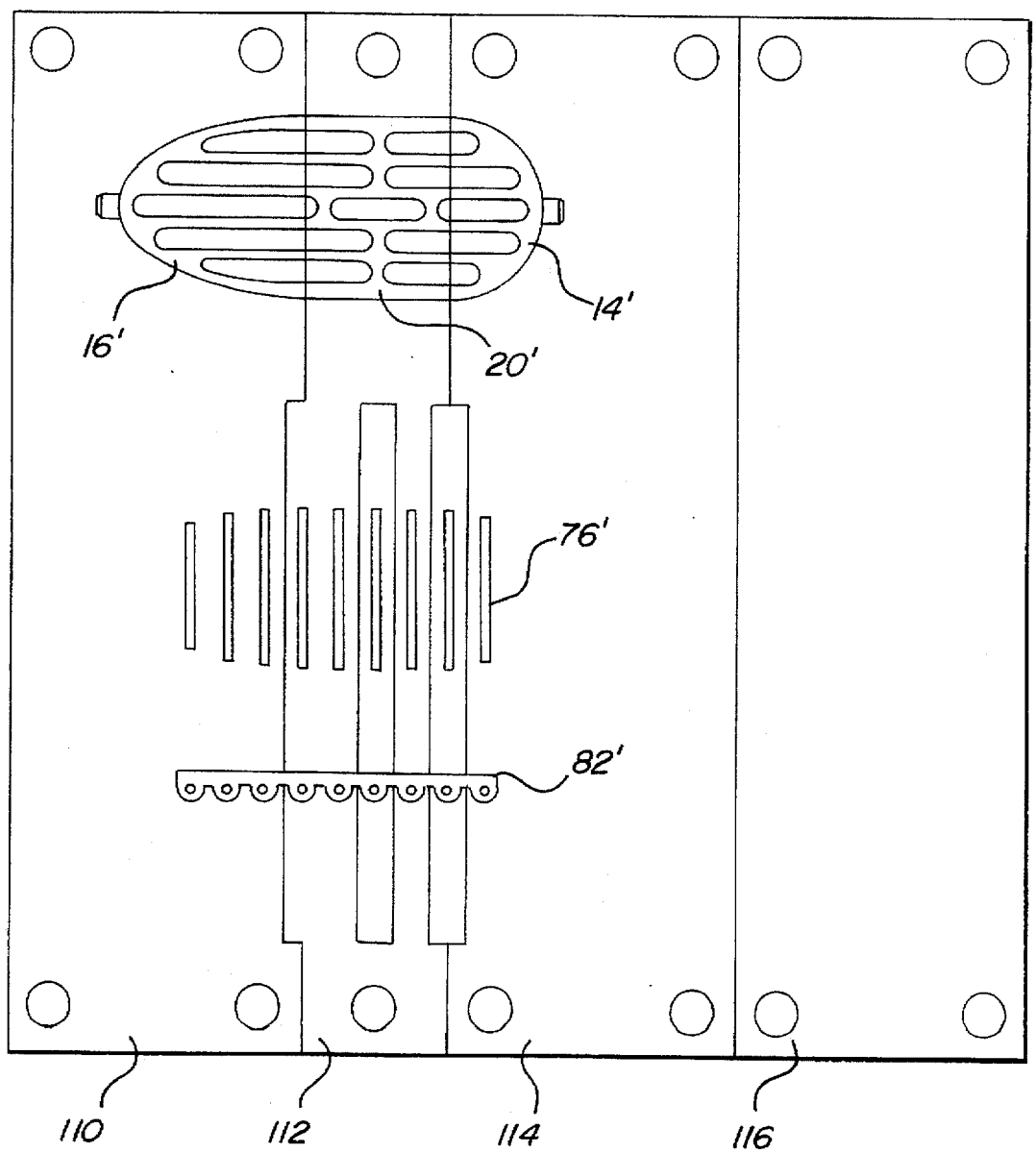
FIG. 5 is a cross sectional view of a mold utilized as an alternative method of making the assembly.

FIG. 5 illustrates an alternative method of forming an outlet assembly 10 from a plurality of modular molds 110, 112, 114, 116. The molds 110, 112, 114 are used to produce the assembly 10 illustrated in FIG. 2. It is to be understood that an additional mold may be provided for each different end module utilized. The mold module 110–114 provides the necessary cavities 14', 20', 16' to create the end module 14, intermediate module 20 and end module 16. The molds 110–114 may be clamped together for molding of plastic therein so that each of the assembled modules will be molded with the others creating a unitary assembly 10. The mold modules 110–114 may be combined as desired, and other shapes may be provided. Also provided in the molds 110–114 are the appropriate mold cavities 76' for forming the appropriate sized and quantities of louvers 76 for each selected module. Also provided in the molds 110–114 are the appropriate mold cavities 82' for the control plate 82 of desired proportion.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A method of forming an outlet assembly comprising:
providing a first end module having arms extending therefrom establishing a first open side;
providing a second end module having arms extending therefrom establishing a second open side;
providing a third end module having arms extending therefrom establishing a third open side, the third end module having a partial perimeter shape different from said second end module;
selectively assembling the first member to the second member to provide a first outlet housing of a first perimeter shape and assembling the first member to the third member to provide a second outlet housing of a second perimeter shape different from said first perimeter shape.

2. A method as set forth in claim 1 further including providing an intermediate module having arms extending from two open ends thereof forming a portion of the sides.

3. A method as set forth in claim 2 further including selectively assembling any number of the intermediate module between any two of the first end module or second end module or third end module to extend the length of said outlet assembly.

4. A method as set forth in claim 3 further including providing first interconnecting members extending from said arms of said first end module.

5. A method as set forth in claim 4 further including providing second interconnecting members extending from said arms of said second end module for interconnecting with any other interconnecting means.

6. A method as set forth in claim 5 further including providing third interconnecting members extending from said arms of said third end module for interconnecting with any other interconnecting means.

7. A method as set forth in claim 6 further including providing intermediate interconnecting members on the arms of the intermediate module for engaging with the interconnecting members on the end modules and other intermediate interconnecting members.

8. A method as set forth in claim 7 further including providing multiple of the intermediate members.

9. A method as set forth in claim 8 further including selectively assembling any number of the intermediate members between said first and second end modules.

10. A method as set forth in claim 1 further including providing at least one intermediate vane spaced from said arms and extending from any of said first, second or third ends and including interconnecting members at the ends thereof.

11. A method as set forth in claim 1 further including rotatably securing the outlet housing to a housing support for rotation about first axis to redirect air.

12. A method as set forth in claim 11 further including pivotable securing louvers to said outlet housing for pivotal movement along an axis different from said first axis.

13. A modular outlet assembly having sides extending between first and second ends, said assembly comprising:
a first end module forming the first end and having arms extending therefrom establishing a portion of the sides and forming a first open side;
a second end module forming the second end and having arms extending therefrom establishing a portion of the sides and forming a second open side;
interconnecting members connected in said arms of each of said first and second end modules along said open sides for interconnecting said first and second ends forming a first outlet housing; and
a third end module having arms extending therefrom and forming a third open end with interconnecting members connected to said arms and of a contour different from said second end module, said third end module selectively replaceable with said second module forming a outlet housing of different shape from said first outlet housing.

14. An assembly as set forth in claim 13 further including an intermediate module having arms extending from two open ends thereof forming a portion of the sides.

15. An assembly as set forth in claim 14 further including any number of the intermediate module assembled between any two of the first end module or second end module or third end module to extend the length of said outlet assembly.

16. An assembly as set forth in claim 15 further including first interconnecting members extending from said arms of said first end module.

17. An assembly as set forth in claim 14 further including second interconnecting members extending from said arms of said second end module for interconnecting with any other interconnecting means.

18. An assembly as set forth in claim 15 further including third interconnecting members extending from said arms of said third end module for interconnecting with any other interconnecting means.

19. An assembly as set forth in claim 16 further including intermediate interconnecting members on the arms of the intermediate module for engaging with the interconnecting members on the end modules and other intermediate interconnecting members.

20. An assembly as set forth in claim 11 further including at least the intermediate vane spaced from said arms and extending from any of said first, second or third ends and including interconnecting members at the ends thereof.

21. An assembly as set forth in claim 13 further including a housing support rotatably supporting said outlet assembly for rotation about a first axis.

22. An assembly as set forth in claim 21 further including louvers pivotally secured to said outlet housing for pivotal movement about a second axis different from said first axis.

23. A modular outlet assembly having sides extending between first and second ends, said assembly comprising;
   a first end module forming the first end and having arms extending therefrom establishing a portion of the sides and forming a first open side;
   a second end module forming the second end and having arms extending therefrom establishing a portion of the sides and forming a second open side;
   any number of intermediate modules each having arms extending from two open ends thereof forming a portion of the sides;
   and interconnecting members connected to each of said arms for connecting said intermediate module to each of said first end and said second end module to form an extended outlet assembly.

24. A method as set forth in claim 23 further including providing at least the intermediate vane spaced from said arms and extending from any of said first, second or third ends and including interconnecting members at the ends thereof.

25. A modular outlet assembly having sides extending between first and second ends, said assembly comprising:
   a housing support;
   a barrel housing pivotally connected to said housing support, said barrel housing including:
   a first end module forming the first end and having arms extending therefrom establishing a portion of the sides and forming a first open side;
   a second end module forming the second end and having arms extending therefrom establishing a portion of the sides and forming a second open side; and
   any number of intermediate modules each having arms extending from two open ends thereof forming a portion of the sides.

26. An assembly as set forth in claim 25 further including a louver assembly connected to said barrel housing to allow redirection of air side to side.

27. A method of forming an outlet assembly comprising:
   providing a first end module mold having a cavity with arms extending therefrom establishing a first open side;
   providing a second end module mold having a cavity with arms extending therefrom establishing a second open side;
   providing a third end module mold having a cavity with arms extending therefrom establishing a third open side, the cavity of the third end module mold having a partial perimeter shape different from the cavity of the second end module mold;
   selectively assembling the first mold to the second mold to provide a first combined cavity of a first perimeter shape and assembling the first mold to the third mold to provide a second combined cavity of a second perimeter shape different from the first perimeter shape;
   and molding plastic within the first or second cavities to form an outlet assembly of selective geometry.

* * * * *